US012671462B2

(12) United States Patent
Fang et al.

(10) Patent No.: US 12,671,462 B2
(45) Date of Patent: Jun. 30, 2026

(54) LONG-RANGE RADIO COMMUNICATION METHOD AND DEVICE BASED ON SPREADING FACTOR INDEX

(71) Applicant: Guangdong University of Technology, Guangzhou (CN)

(72) Inventors: Yi Fang, Guangzhou (CN); Hao Zeng, Guangzhou (CN); Bo Nie, Guangzhou (CN); Huan Ma, Guangzhou (CN); Dingfei Ma, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/220,023

(22) Filed: Jun. 29, 2025

(65) Prior Publication Data

US 2026/0005722 A1     Jan. 1, 2026

(51) Int. Cl.
*H04B 1/69* (2011.01)

(52) U.S. Cl.
CPC ....... *H04B 1/69* (2013.01); *H04B 2001/6912* (2013.01)

(58) Field of Classification Search
CPC ... H04B 1/69; H04B 2001/6912; Y02D 30/70
See application file for complete search history.

(56) References Cited

U.S. PATENT DOCUMENTS

| | | | |
|---|---|---|---|
| 10,778,282 B1 | 9/2020 | Hanif et al. | |
| 2011/0064119 A1* | 3/2011 | Sforza | H04B 1/69 |
| | | | 375/139 |
| 2018/0336308 A1* | 11/2018 | Dokken | G01S 13/87 |

FOREIGN PATENT DOCUMENTS

| | | |
|---|---|---|
| CN | 116389208 A | 7/2023 |
| CN | 117200825 A | 12/2023 |

* cited by examiner

*Primary Examiner* — Sung S Ahn

(57) ABSTRACT

Disclosed are a long-range radio communication method and device based on a spreading factor index, the method including: within one symbol period, dividing a plurality of information bits into index bits and modulated bits; mapping the index bits into a spreading factor sequence, and generating first chirp signals corresponding to various spreading factors (SFs); and converting the modulated bits to decimal numbers associated with the various SFs, modulating the decimal numbers into carrying signals, multiplying the carrying signals by the first chirp signals associated with the SFs to obtain second chirp signals associated with the various SFs, and superposing the second chirp signals to obtain a transmitted signal. According to the disclosure, by combining different SFs, an additional dimension is created to carry more information bits, so as to achieve the effect of increasing a data rate.

18 Claims, 6 Drawing Sheets

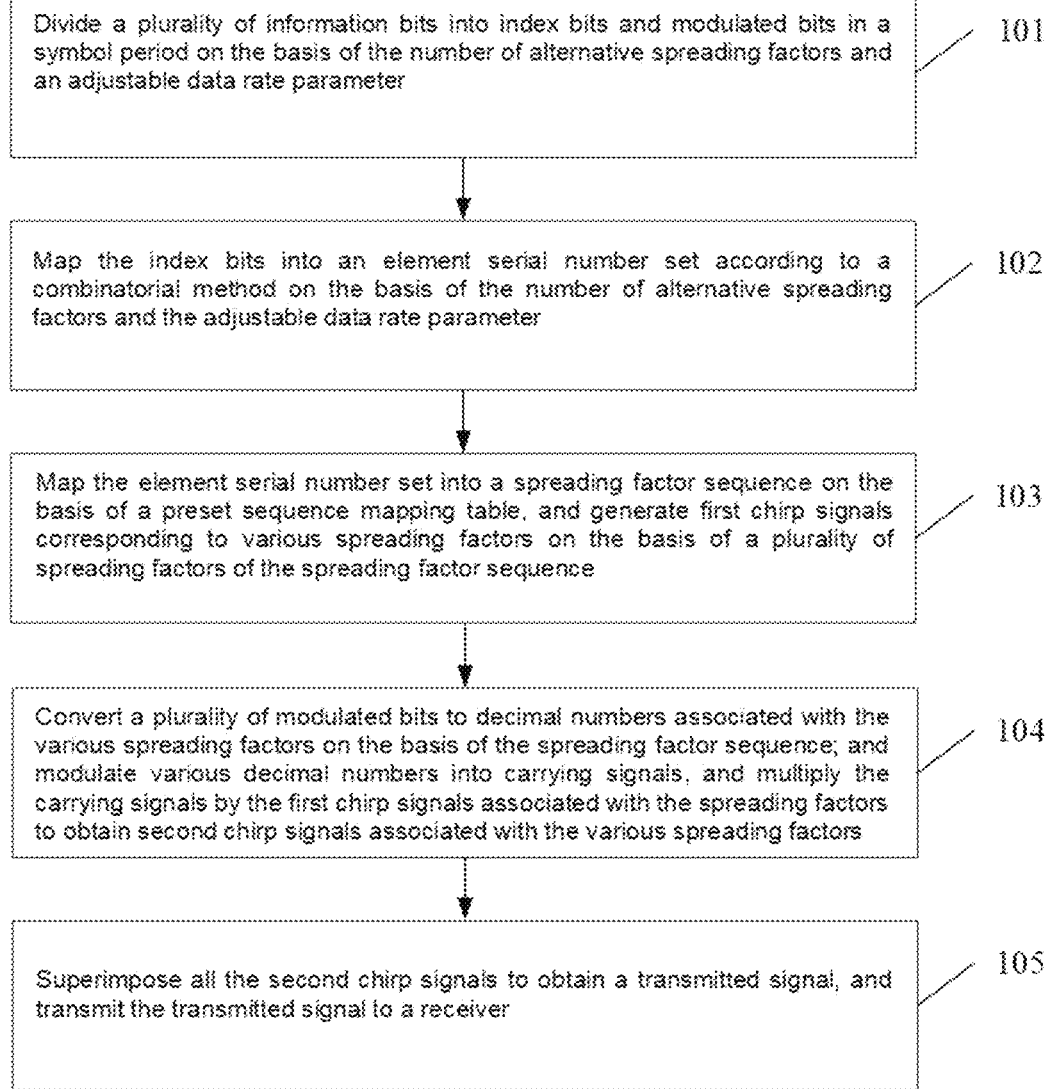

Divide a plurality of information bits into index bits and modulated bits in a symbol period on the basis of the number of alternative spreading factors and an adjustable data rate parameter — 101

Map the index bits into an element serial number set according to a combinatorial method on the basis of the number of alternative spreading factors and the adjustable data rate parameter — 102

Map the element serial number set into a spreading factor sequence on the basis of a preset sequence mapping table, and generate first chirp signals corresponding to various spreading factors on the basis of a plurality of spreading factors of the spreading factor sequence — 103

Convert a plurality of modulated bits to decimal numbers associated with the various spreading factors on the basis of the spreading factor sequence; and modulate various decimal numbers into carrying signals, and multiply the carrying signals by the first chirp signals associated with the spreading factors to obtain second chirp signals associated with the various spreading factors — 104

Superimpose all the second chirp signals to obtain a transmitted signal, and transmit the transmitted signal to a receiver — 105

FIG. 1

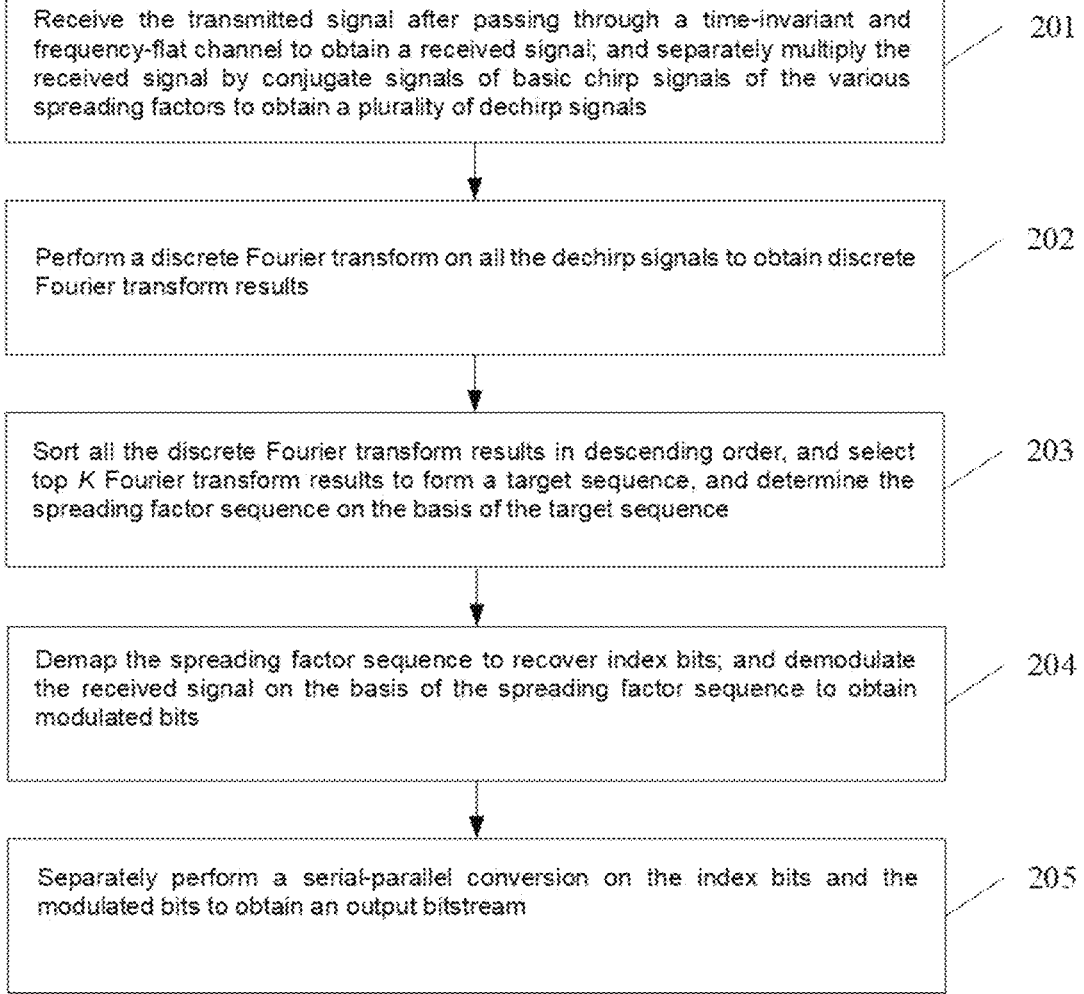

Receive the transmitted signal after passing through a time-invariant and frequency-flat channel to obtain a received signal; and separately multiply the received signal by conjugate signals of basic chirp signals of the various spreading factors to obtain a plurality of dechirp signals — 201

Perform a discrete Fourier transform on all the dechirp signals to obtain discrete Fourier transform results — 202

Sort all the discrete Fourier transform results in descending order, and select top $K$ Fourier transform results to form a target sequence, and determine the spreading factor sequence on the basis of the target sequence — 203

Demap the spreading factor sequence to recover index bits; and demodulate the received signal on the basis of the spreading factor sequence to obtain modulated bits — 204

Separately perform a serial-parallel conversion on the index bits and the modulated bits to obtain an output bitstream — 205

FIG. 2

LONG-RANGE RADIO COMMUNICATION METHOD AND DEVICE BASED ON SPREADING FACTOR INDEX

CROSS-REFERENCE TO RELATED APPLICATION

This application claims priority of Chinese Patent Application No. 202410684502.4, filed on May 30, 2024, the entire contents of which are incorporated herein by reference.

TECHNICAL FIELD

The disclosure relates to the field of communication technology, and in particular to a long-range radio (LoRa) communication method and device based on a spreading factor index (SFI).

BACKGROUND

In the contemporary development trend of Internet of Things (IoT), facing various demands from different application scenarios, the conventional wireless communication technology can no longer meet the demand of low power and low cost of IoT at this stage. To solve this problem, directly targeting the three major characteristics of IoT, industrial and academic circles have proposed the concept of low power wide area network (LPWAN). As a new type of wireless communication network, LPWAN can realize kilometer-level long-range communication by using low-power transmission technology, and has lower hardware complexity in its terminal equipment. These excellent characteristics enable it to well meet the demand of IoT for low power and wide coverage at this stage. Having unique network architecture, security service, network access mode, localization service, and flexible terminal working mode, long-range radio wide area network (LoRaWAN) is regarded as the LPWAN technology with the highest degree of freedom for IoT deployment.

LoRa modulation technology, which is a physical layer transmission technology of LoRaWAN, uses LoRa signals that are a type of chirp spread spectrum (CSS) modulation. This approach essentially involves cyclic shifting of chirp signals, so it is also known as frequency shift chirp modulation (FSCM) or frequency shift chirp spread spectrum (FSCSS). The LoRa modulation technology, with excellent characteristics such as anti-noise and anti-wireless fading, attracts extensive attention in both industrial and academic circles. Compared with other LPWAN technologies, LoRa technology is low in cost, flexible in deployment and good in anti-Doppler performance, and more importantly, LoRa can be flexibly adjusted in terms of transmission distance, reception sensitivity and data rate.

There are two factors affecting the data rate of LoRa: bandwidth (BW) and spreading factor (SF). The symbol data rate can be expressed as $BW/2^{SF}$, and increasing BW can improve the data rate, but at the same time reduce the sensitivity of the LoRa system and shorten the wireless communication distance. In the case of a limited BW, the only way to improve the data rate is to reduce SF, but at the same time, it will shorten the communication range. Currently, there are numerous studies on improving the data rate of LoRa, such as the optimized design for LoRa modulation technology. However, these optimizations often come at the cost of the complexity of a receiver and bit error rate (BER) performance, and the maximum data rate remains insufficient to meet the demands of the current rapid development application scenarios such as smart home, smart city and Internet of Vehicles.

SUMMARY

The disclosure provides a LoRa communication method and device based on SFI, to solve the technical problem that the lower data rate of the existing LoRa modulation technology limits its application scenarios.

In a first aspect of the disclosure, a LoRa communication method based on SFI is provided, including:

within one symbol period, dividing a plurality of information bits into a plurality of index bits and a plurality of modulated bits on the basis of the number of alternative SFs and an adjustable data rate parameter;

mapping the index bits into an element serial number set according to a combinatorial method on the basis of the number of alternative SFs and the adjustable data rate parameter;

mapping the element serial number set into an SF sequence on the basis of a preset sequence mapping table; and generating first chirp signals corresponding to various SFs on the basis of a plurality of SFs of the SF sequence, where the SF sequence is S, $S=\{s_1, \ldots, s_K\}$, and K types of SFs are present in the SF sequence;

converting the modulated bits to decimal numbers on the basis of each element within the SF sequence, respectively; and modulating various decimal numbers into carrying signals, and multiplying the carrying signals by the first chirp signals associated with the SFs to obtain second chirp signals associated with the K types of SFs; and superimposing all the second chirp signals to obtain a transmitted signal, and transmitting the transmitted signal to a receiver.

Furthermore, the number of the index bits is determined by the number of alternative SFs and the adjustable data rate parameter; and the number of the modulated bits is determined by the SF sequence.

Furthermore, the step of mapping the index bits into the element serial number set according to the combinatorial method on the basis of the number of alternative SFs and the adjustable data rate parameter includes:

converting the index bits to decimal numbers; and mapping the decimal numbers into the element serial number set according to the combinatorial method on the basis of the number of alternative SFs and the adjustable data rate parameter, where the element serial number set is a monotonically decreasing sequence having a length identical to that of the adjustable data rate parameter.

Furthermore, the following is included:

receiving the transmitted signal after passing through a time-invariant and frequency-flat channel to obtain a received signal; and separately multiplying the received signal by conjugate signals of basic chirp signals of the various SFs to obtain a plurality of dechirp signals;

performing a discrete Fourier transform (DFT) on all the dechirp signals to obtain DFT sequences;

taking maximum values of all the DFT sequences and sorting same in descending order, selecting top K maximum values to form a target sequence, and determining the SF sequence on the basis of the target sequence;

demapping the SF sequence to recover index bits; and demodulating the received signal on the basis of the SF sequence to obtain modulated bits; and separately performing a serial-parallel conversion on the index bits and the modulated bits to obtain an output bitstream.

Furthermore, the step of demodulating the received signal on the basis of the SF sequence to obtain the modulated bits includes:

dividing the received signal into a plurality of signal sub-blocks on the basis of the SF sequence;

separately performing dechirp, the DFT and peak detection sequentially on the signal sub-blocks to recover index values of peaks of various sub-blocks; and recovering the modulated bits on the basis of all the index values associated with the signal sub-blocks.

In a second aspect of the disclosure, a LoRa communication system based on SFI is provided, including: a transmitter and a receiver. The transmitter is configured to modulate information bits within one symbol period into a plurality of second chirp signals, superimpose all the second chirp signals to obtain a transmitted signal, and transmit the transmitted signal to the receiver;

the transmitter includes a bit divider, a bit mapper, an index selector, a chirp signal generator, a base converter and a modulator;

the bit divider is separately connected to the bit mapper and the base converter, and is configured to divide a plurality of information bits into a plurality of index bits and a plurality of modulated bits on the basis of the number of alternative SFs and an adjustable data rate parameter, transmit the index bits to the bit mapper, and transmit the modulated bits to the base converter;

the bit mapper is connected to the index selector, and is configured to map the index bits into an element serial number set according to a combinatorial method on the basis of the number of alternative SFs and the adjustable data rate parameter, and transmit the element serial number set to the index selector;

the index selector is connected to the chirp signal generator, and is configured to map the element serial number set into an SF sequence on the basis of a preset sequence mapping table; and generate first chirp signals corresponding to various SFs on the basis of a plurality of SFs of the SF sequence, where the SF sequence is S, $S=\{s_1, \ldots, s_K\}$, and K types of SFs are present in the SF sequence; and the base converter is connected to the modulator, and is configured to convert a plurality of modulated bits to decimal numbers associated with various SFs on the basis of the SF sequence; and modulate various decimal numbers into carrying signals, and multiply the carrying signals by the first chirp signals associated with the SFs to obtain second chirp signals associated with the various SFs.

Furthermore, the bit mapper is connected to the index selector, and is specifically configured to convert the index bits to decimal numbers; and map the decimal numbers into the element serial number set according to the combinatorial method on the basis of the number of alternative SFs and the adjustable data rate parameter, where the element serial number set is a monotonically decreasing sequence having a length identical to that of the adjustable data rate parameter.

Furthermore, the receiver includes an SF sequence generation unit, an index searcher, a demodulator and a conversion unit;

the SF sequence generation unit is separately connected to the index searcher and the demodulator, and is configured to receive the transmitted signal after passing through a time-invariant and frequency-flat channel to obtain a received signal; and separately multiply the received signal by conjugate signals of basic chirp signals of the various SFs to obtain a plurality of dechirp signals; perform a DFT on all the dechirp signals to obtain DFT sequences; take maximum values of all the DFT sequences and sort same in descending order, select top K maximum values to form a target sequence, and determine the SF sequence on the basis of the target sequence; and separately transmit the SF sequence to the index searcher and the demodulator;

the index searcher is connected to the conversion unit, and is configured to demap the SF sequence to recover index bits, and transmit the index bits to the conversion unit;

the demodulator is connected to the conversion unit, and is configured to demodulate the received signal on the basis of the SF sequence to obtain modulated bits; and the conversion unit is configured to perform a serial-parallel conversion separately on the index bits and the modulated bits to obtain an output bitstream.

In a third aspect of the disclosure, a LoRa communication apparatus based on SFI is further provided. The apparatus includes a processor and a memory.

The memory is configured to store a program code, and transmit the program code to the processor; and the processor is configured to execute the LoRa communication method mentioned above according to an instruction in the program code.

In a fourth aspect of the disclosure, a computer-readable storage medium is further provided. The computer-readable storage medium is configured to store a program code, and the program code is configured to execute the LoRa communication method mentioned above.

It can be seen from the technical solutions described above that the disclosure has the following advantages.

The disclosure provides a LoRa communication method and device based on SFI, the method including: within one symbol period, dividing a plurality of information bits into a plurality of index bits and a plurality of modulated bits on the basis of the number of alternative SFs and an adjustable data rate parameter; mapping the index bits into an element serial number set according to a combinatorial method on the basis of the number of alternative SFs and the adjustable data rate parameter; mapping the element serial number set into an SF sequence on the basis of a preset sequence mapping table; generating first chirp signals corresponding to various SFs on the basis of a plurality of SFs of the SF sequence; converting a plurality of modulated bits to decimal numbers associated with the various SFs on the basis of the SF sequence; and modulating various decimal numbers into carrying signals, and multiplying the carrying signals by the first chirp signals associated with the SFs to obtain second chirp signals associated with the various SFs; and superimposing all the second chirp signals to obtain a transmitted signal.

In the disclosure, an index rule is designed by leveraging the good cross correlation among LoRa signals of different SFs and applying a combinatorial method. According to the combinatorial method, the index bits are mapped into the element serial number set, and then on the basis of the preset sequence mapping set, the element serial number set is indexed to obtain combination sequences of different SFs, i.e., the SF sequences. In this way, different SFs are combined to create an additional dimension for carrying more information bits, so as to achieve the effect of enhancing the data rate, thereby solving the technical problem that the lower data rate of the existing LoRa modulation technology limits its application scenarios.

BRIEF DESCRIPTION OF THE DRAWINGS

To describe more clearly the embodiments of the disclosure or the technical solutions that can be achieved in combination with the prior art, the attached drawings needed in the description of the embodiments or prior art are briefly stated below. Obviously, the drawings described below are only some embodiments of the disclosure. For those ordinary skilled in the art, other drawings can be obtained according to these drawings without creative efforts.

FIG. 1 is a first step flowchart of a LoRa communication method based on SFI provided in an embodiment of the disclosure;

FIG. 2 is a second step flowchart of the LoRa communication method based on SFI provided in an embodiment of the disclosure;

DETAILED DESCRIPTION

Embodiments of the disclosure provide a LoRa communication method and device based on SFI, to solve the technical problem that the lower data rate of the existing LoRa modulation technology limits its application scenarios.

To make the inventive objective, features and advantages of the disclosure more obvious and understandable, the technical solutions of the embodiments in the disclosure will be described clearly and completely by reference to the attached drawings of the embodiments in the disclosure below. Obviously, the embodiments described below are only some, rather than all embodiments of the disclosure. On the basis of the embodiments of the disclosure, all other embodiments obtained by those ordinary skilled in the art without creative efforts fall within the scope of protection of the disclosure.

In prior art, algorithm research is also employed to enhance the data rate of the LoRa system, predominantly focusing on network-layer technology such as routing algorithm optimization, collision recovery and decoding algorithm for data packets, and resolution of data packet collision problems. However, comparing with the physical layer modulation technology of optimizing LoRa system, the algorithm-based method for enhancing the data rate of the LoRa system often substantially increases the system complexity and communication cost of the LoRa system. As a result, the disclosure mainly optimizes the modulation technology intrinsic to the LoRa system, aiming to achieve higher data rate while effectively reducing the impact on system complexity and communication cost.

Figure 7:
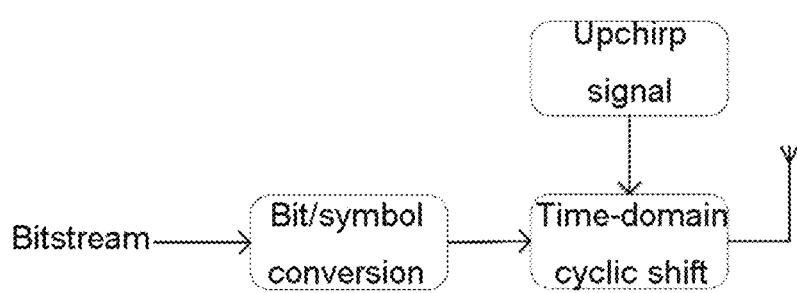
FIG. 7 is a structural diagram of a transmitter of a LoRa system in the prior art.
Figure 8:
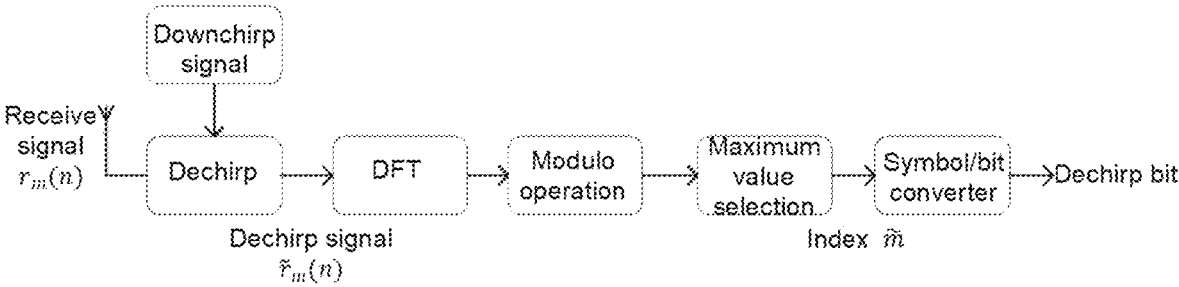
FIG. 8 is a structural diagram of a receiver of the LoRa system in the prior art.

Referring to FIG. 7 and FIG. 8, FIG. 7 is a structural diagram of a transmitter of a LoRa system in prior art provided in an embodiment of the disclosure, and FIG. 8 is a structural diagram of a receiver of the LoRa system in prior art provided in an embodiment of the disclosure. The processing flow of the transmitter and receiver in the LoRa communication system that can be achieved by combining prior art is further described.

The method by which the transmitter processes symbols in the LoRa communication system is the modulation method of LoRa, with the processing flow of symbols by the transmitter shown in FIG. 7. The SF in the LoRa communication system is in decimal, and the value of the commonly used SF satisfies $SF \in \{7, 8, \ldots, 12\}$. For a segment of bitstream to be transmitted, the transmitter divides it into several LoRa symbols, with SF bits in a group, thus the conversion from the bitstream to decimal number is completed. It can be seen therefrom that there are a total of $2^{SF}$ types of LoRa symbols in the LoRa communication system. Assuming a set of decimal numbers carried by the LoRa symbols in the LoRa system as M, $M=\{0, 1, \ldots, 2^{SF}\}$.

To enable a specific decimal number m to be carried onto a LoRa signal as a LoRa symbol, it is necessary to first determine the expression form of the basic chirp signal in the LoRa communication system. The basic chirp signal is also referred to as an upchirp signal, which means that within one symbol time interval, the frequency of the upchirp signal will linearly increases from 0 to the size of BW of the communication system. Assuming that the BW of the LoRa communication system is B, and the time period of one LoRa symbol is $T_{sym}$, one of the basic chirp signals in a discrete time domain can be expressed as:

$$W_{SF,0}(nT_{sam}) = \sqrt{\frac{1}{2^{SF}}} \exp\left[j2\pi \frac{(nT_{sam})^2}{2} \frac{B}{\tau_{sym}}\right] \quad (1)$$

where $w_{SF,0}$ ($nT_{sam}$) represents a basic chirp signal corresponding to a specific SF in a discrete time domain; $T_{sam}$ represents a sampling interval of a signal, satisfying $$T_{sam} = \frac{1}{B};$$

and n represents an index of a sampling point, satisfying $n \in \{0, 1, \ldots, 2^{SF}\}$, so that one basic chirp signal is divided into $2^{SF}$ sampling points, satisfying $T_{sym}=2^{SF}T_{sam}$. In summary, the expression of the basic chirp signal can be further simplified as $w_{SF,0}$ (n):

$$W_{SF,0}(n) = \sqrt{\frac{1}{2^{SF}}} \exp\left[j2\pi \frac{n^2}{2^{SF+1}}\right] \quad (2)$$

To transmit the above-mentioned $2^{SF}$ decimal numbers onto the basis chirp signal via a carrier wave, time-domain cyclic shift is needed to perform on the basic chirp signal. The chirp signal carrying the symbol m is specifically as:

$$W_{SF,m}(n) = \sqrt{\frac{1}{2^{SF}}} \exp\left[ j2\pi \frac{\left((n+m)\mathrm{mod}2^{SF}\right)^2}{2^{SF+1}} \right] \qquad (3)$$

where the symbol m satisfies $m \in M = \{0, 1, \ldots, 2^{SF}\}$, and $w_{SF,m}(n)$ is a shifted chirp signal.

It can be seen from formulas (1) to (3) that the shifted chirp signal $w_{SF,m}(n)$ not only performs the time-domain cyclic shift on the basic chirp signal, but also performs shift in frequency, that is, the initial frequency of the basic chirp signal will change from 0 to $f_m$, satisfying $f_m = B \times m/2^{SF}$, and a slope of the linear increase of its frequency is $B^2/2^{SF}$. In one symbol period, the frequency of the basic chirp signal will linearly increase from $f_m$ to B, and then mutate to 0, and continuously linearly increase to $f_m$. In this way, the symbolic modulation of the chirp signal is completed, namely LoRa modulation.

When the LoRa signal is transmitted by the antenna and passes through a time-invariant and frequency-flat channel, the LoRa signal received by the receiver is expressed as:

$$r_m(n) = h\sqrt{E}\, w_{SF,m}(n) + z(n) \qquad (4)$$

where $r_m(n)$ represents a LoRa signal received by the receiver, E represents energy of the transmitted LoRa signal, h represent a complex envelope amplitude of a channel, and $z(n)$ represents a complex additive white Gaussian noise (AWGN). $z(n)$ follows a complex Gaussian distribution with a mean of 0 and a variance of $N_0$, denoted as $z(n) \sim CN(0, N_0)$.

After the receiver receives the LoRa signal, LoRa signal will be demodulated. Referring to FIG. 8, first, the dechirp operation is required: one downchirp signal is multiplied by the received LoRa signal. The downchirp signal actually refers to a conjugate signal of the basic chirp signal. A conjugate signal of the basic chirp signal corresponding to a specific SF is expressed as $$w_{SF,0}^{*}(n).$$

After the dechirp operation is completed, the dechirp signal $\tilde{r}_m(n)$ can be obtained, and is expressed as:

$$\tilde{r}_m(n) = r_m(n) \times w_{SF,0}^{*}(n) = \frac{h\sqrt{E}}{2^{SF}} \exp\left[ j2\pi \frac{m^2 + 2mn}{2^{SF+1}} \right] + \tilde{z}(n) \qquad (5)$$

$\tilde{z}(n)$ satisfies $$\tilde{z}(n) = z(n) \times w_{SF,0}^{*}(n),$$

and still is the complex AWGN.

Next, the receiver will perform $2^{SF}$ point-DFT on the obtained dechirp signal $\tilde{r}_m(n)$. The results $\Xi_m(k)$ after the transform is expressed as:

$$\Xi_m(k) = \sum_{n=0}^{2^{SF}-1} \tilde{r}_m(n) \exp\left( \frac{-j2\pi kn}{2^{SF}} \right) = \qquad (6)$$

-continued $$\sum_{n=0}^{2^{SF}-1} \frac{|h| \exp(j\varphi_h)\sqrt{E}}{2^{SF}} \exp\left( \frac{j2\pi(m^2 + 2mn)}{2^{SF+1}} - \frac{j2\pi kn}{2^{SF}} \right) +$$

$$\underbrace{\sum_{n=0}^{2^{SF}-1} z(n) \exp\left( \frac{-j2\pi kn}{2^{SF}} \right)}_{z(k)} =$$

$$\frac{|h|\sqrt{E}}{2^{SF}} \exp\left( \frac{j2\pi m^2}{2^{SF+1}} + j\varphi_h \right) \sum_{n=0}^{2^{SF}-1} \exp\left( \frac{j\pi(m-k)n}{2^{SF-1}} \right) + Z(k)$$

where k and m are integers, $|h|$ represents an absolute value of h, $\varphi_h$ is a phase deviation caused by channel, and Z(k) represents a complex AWGN, satisfying $Z(k) \sim CN(0, N_0)$.

An amplitude of $\Xi_m(k)$ is taken, then:

$$|\Xi_m(k)| = \begin{cases} \left| |h|\sqrt{E} \exp(j\varphi_m) + Z(k) \right| & , k = m \\ |Z(k)| & , k \neq m \end{cases} \qquad (7)$$

where $\varphi_m$ represents a phase portion, satisfying $$\varphi_m = \frac{2\pi k^2}{2^{SF+1}} + \varphi_h.$$

By comparing the maximum value of $|\Xi_m(k)|$, an index corresponding to the maximum value can be selected, and is expressed as an estimated transmitted symbol $\tilde{m}$, and the transmitted symbol $\tilde{m}$ is:

$$\tilde{m} = \underset{k \in M}{\mathrm{argmax}}(|\Xi_m(k)|) \qquad (8)$$

In this way, the detection of transmitted symbols by the LoRa communication system is achieved. Next, after restoring the transmitted symbols to the bitstream, the LoRa demodulation is completed.

The data rate achievable in the LoRa system combined with the prior art can be expressed as $SF/T_{sym}$, consequently, the data rate of the LoRa system achieved by combining the prior art is struggle to meet the requirements of rapidly developing intelligent application scenarios of IoT. In the disclosure, the modulation and demodulation solutions for LoRa communication systems achieved by combining the prior art are further optimized, and a LoRa communication system based on SFI (hereinafter referred to as SFI-LoRa system) is proposed. The SFI-LoRa system includes a transmitter and a receiver. The transmitter is configured to convert information bits within one symbol period to a transmitted signal and transmit the transmitted signal into the receiver. The receiver is configured to receive and demodulate the transmitted signal after passing through a time-invariant and frequency-flat channel, and finally, an output bitstream is obtained. In the disclosure, good cross correlation among LoRa signals of different SFs is utilized to design an index rule, and meanwhile, the combinatorial method is introduced into the chirp communication system. According to the combinatorial method, the information bits are converted to decimal numbers to select activity indexes, and by fully utilizing the one-to-one mapping between natural numbers and combinatorial numbers, SFs are combined to create an additional dimension for carrying more information bits, so as to achieve the effect of enhancing the data rate.

Referring to FIG. 1, FIG. 1 is a step flowchart of a LoRa communication method based on SFI provided in an embodiment of the disclosure.

A LoRa communication method based on SFI provided in the disclosure includes the following steps.

Step 101, within one symbol period, a plurality of information bits are divided into a plurality of index bits and a plurality of modulated bits on the basis of the number of alternative SFs and an adjustable data rate parameter.

In the embodiment, assuming that the total number of information bits transmitted by the system within one symbol period is denoted as p. Upon receiving the information bits, the transmitter needs to divide the information bits into two parts: index bits and modulated bits.

It is to be noted that the LoRa physical layer protocol stipulates SF in the LoRa communication system satisfies $SF \in \{6, 7, \ldots, 12\}$. The LoRa physical layer protocol is a private protocol of the Semtech company. In practical applications, when SF=6, additional configuration on a LoRa chip is needed and only be used in specific situations. Therefore, the situation where SF=6 is not taken into consideration in the disclosure. In the embodiment, there are six possible values for SF, i.e., $SF \in \{7, 8, \ldots, 12\}$, so the value of the number of alternative SFs $l_1$ is 6. $l_2$ is the adjustable data rate parameter of the system, and can be dynamically adjusted according to actual demands. The value range of $l_2$ is $[1, l_1]$.

The number of the index bits is determined by the number of alternative SFs $l_1$ and the adjustable data rate parameter $l_2$, and is specifically as:

$$Num_{index} = \left\lfloor \log_2 C_{l_1}^{l_2} \right\rfloor \tag{9}$$

Particularly, the number of modulated bits is determined by the index bits and the SF sequence. In the disclosure, the index bits are first determined, and then step 102 and step 103 are performed, and the number of the modulated bits is determined, so that the division of the modulated bits in step 101 is completed.

Step 102, the index bits are mapped into an element serial number set according to a combinatorial method on the basis of the number of alternative SFs and the adjustable data rate parameter.

It is to be noted that, in the disclosure, an index rule is designed by leveraging good cross correlation among LoRa signals of different SFs and applying the combinatorial method, and the index bits are mapped into combination sequences of different SFs to create an additional dimension for carrying more information bits. On this basis, in the disclosure, a combinatorial method and a preset sequence mapping table are designed. The combinatorial method reflects the mapping relationship between the index bits and combinatorial numbers, and the preset sequence mapping table reflects the mapping relationship between the combinatorial numbers and combination sequences of different SFs.

Step 102 specifically includes the following steps.

Step 1021, the index bits are converted to decimal numbers.

The combinatorial method fully leverages the one-to-one mapping between natural numbers and combinatorial numbers, with the prerequisite for achieving this mapping being the conversion of index bits into decimal numbers. Only through such conversion can the mapping between index bits and combinatorial numbers be realized.

Step 1022, the decimal numbers are mapped into an element serial number set according to a combinatorial method on the basis of the number of alternative SFs and the adjustable data rate parameter.

It is to be noted that, for any natural number $$Z \in \left[0, C_{l_1}^{l_2} - 1\right], \text{ where } C_{l_1}^{l_2} = \frac{l_1!}{l_2!(l_1 - l_2)!},$$

on the basis of the combinatorial method, the natural number Z can be mapped into a strictly monotonically decreasing sequence having a length of $l_2$. For the fixed values of $l_1$ and $l_2$, in the embodiment, according to the combinatorial method, the decimal numbers can be mapped into an element serial number set $S^* = \{d_{l_2}, \ldots, d_1\}$ with a length of $l_2$, where $d_{l_2} > d_{l_2-1} > \ldots > d_1 \geq 0$ and $d_1, \ldots, d_{l_2} \in \{1, \ldots, l_1-1\}$.

The element serial number set $S^*$ can be obtained by the following equation:

$$Z = C_{d_{l_2}}^{l_2} + \ldots + C_{d_2}^{2} + C_{d_1}^{1} \tag{10}$$

The generation method for the element serial number set $S^*$ can be briefly described as follows: 1) take the maximum value of $d_{l_2}$ on the premise of satisfying $$C_{d_{l_2}}^{l_2} \leq Z; 2)$$

similarly, take the maximum value of $d_{l_2-1}$ on the premise of satisfying $$C_{d_{l_2-1}}^{l_2-1} \leq Z;$$

and by analogy, the sequence $S^*$ with the length $l_2$ is obtained.

For example, taking $l_1=6$, $l_2=3$ and $$Z = C_6^3 = 20$$

as examples, the mapping process between the index bits and the element sequence number set is shown as follows:

TABLE 1

The mapping process between the index bits and the element sequence number set

| Index bits | | Decimal number Z | | Element serial number set S* |
|---|---|---|---|---|
| 1111 | $\rightarrow$ | $15 = C_5^3 + C_3^2 + C_2^1$ | $\rightarrow$ | {5, 3, 2} |
| 1110 | $\rightarrow$ | $14 = C_5^3 + C_3^2 + C_1^1$ | $\rightarrow$ | {5, 3, 1} |
| $\vdots$ | $\rightarrow$ | $\vdots$ | $\rightarrow$ | $\vdots$ |
| 0000 | $\rightarrow$ | $0 = C_2^3 + C_1^2 + C_0^1$ | $\rightarrow$ | {2, 1, 0} |

Step 103, the element serial number set is mapped into an SF sequence on the basis of a preset sequence mapping table; and first chirp signals corresponding to various SFs are generated on the basis of a plurality of SFs of the SF sequence.

It is to be noted that the preset sequence mapping table is used to index available SFs, enabling the combination of different SFs into the SF sequence. This reflexes the mapping relationship between the elements of the element serial number set and SFs in the SF sequence. The preset sequence mapping table is shown as Table 2.

TABLE 2

| Preset sequence mapping table | | | | | | |
|---|---|---|---|---|---|---|
| Elements in element serial number set ↓ | 0 ↓ | 1 ↓ | 2 ↓ | 3 ↓ | 4 ↓ | 5 ↓ |
| SFs in SF sequence | 7 | 8 | 9 | 10 | 11 | 12 |

For easy understanding, $l_1=6$, $l_2=3$ and $$Z = C_6^3 = 20$$

are still taken as examples, the mapping process between the element sequence number set and the SF sequence is shown as Table 3.

TABLE 3

| Mapping process of the element serial number set and the SF sequence | | |
|---|---|---|
| Element serial number set S* | | SF sequence S |
| {5, 3, 2} | → | {12, 10, 9} |
| {5, 3, 1} | → | {12, 10, 8} |
| . | . | . |
| . | . | . |
| . | . | . |
| {2, 1, 0} | → | {9, 8, 7} |

Specifically, assuming that there are K different types of available SFs, the $k_{th}$ type of SF is expressed as $s_k$, and the K types of available SFs can be combined into an SF sequence S, $S=\{s_1, \ldots, s_K\}$, and $s_1>s_2> \ldots s_K$, where the $k_{th}$ SF is expressed as $s_k$, k=1, 2, . . . , K, $s_k \in \{7, \ldots, 12\}$.

Finally, the SF sequence S is inputted into a chirp signal generator to generate first chirp signals associated with K types of SFs. In the disclosure, according to a combinatorial method, the index bits are mapped into an SF combination S, and different SFs are combined to create an additional dimension for carrying more information bits, so as to achieve the effect of enhancing the data rate.

Step 104, a plurality of modulated bits are converted to decimal numbers associated with the various SFs on the basis of the SF sequence; and various decimal numbers are modulated into carrying signals, and the carrying signals are multiplied by the first chirp signals associated with the SFs to obtain second chirp signals associated with the various SFs.

It is to be noted that, after obtaining the SF sequence, the number of the modulated bits transmitted can be determined. Assuming that the number of the modulated bits is $$\sum_{k=1}^{K} \left(\frac{N_1}{N_k}\right) s_k, \sum_{k=1}^{K} \left(\frac{N_1}{N_k}\right) s_k$$

modulated bits are converted to decimal numbers associated with various SFs.

The number of symbols of the decimal number $m_k(i) \in \{0, 1, \ldots, N_k-1\}$ associated with the $k_{th}$ type of SFs is $$\left(\frac{N_1}{N_k}\right),$$

where $N_k \triangleq 2^{s_k}$ and $$i = 1, 2, \ldots, \frac{N_1}{N_k} \text{ and } \sum_{k=1}^{K} \left(\frac{N_1}{N_k}\right) s_k$$

modulated bits are converted to $$\sum_{k=1}^{K} \left(\frac{N_1}{N_k}\right)$$

decimal numbers $m_k(i)$. It is understandable that, each type of SFs is associated with different numbers of decimal numbers.

The various decimal numbers are modulated into carrying signals, and the carrying signals are multiplied by the first chirp signals associated with the SFs, to obtain second chirp signals associated with various SFs. There are K types of second chirp signals. It is understandable that, in this step, first, the decimal numbers are modulated into digital signals, and then the various digital signals are combined with carrier signals with the preset carrier frequency, to obtain carrying signals, and finally, the carrying signals are multiplied by the first chirp signals to obtain the second chirp signals.

Specifically, the $i_{th}$ decimal number $m_k(i)$ is carried to the first chirp signal associated with the $k_{th}$ type of SF $s_k$, to obtain the $i_{th}$ second LoRa signal $x_k(i)$ associated with the SF $s_k$, where $x_k(i)$ is:

$$x_k(i) = \left\{ \exp\left[ j2\pi\left( \frac{((n + m_k(i))\bmod N_k)^2}{2N_k} \right) \right]; n = 0,1, \ldots, N_k - 1 \right\} \quad (11)$$

Step 105, all the second chirp signals are superimposed to obtain a transmitted signal, and the transmitted signal is transmitted to a receiver.

In the embodiment, all the second chirp signals are superimposed and transmitted to obtain the transmitted signal. Specifically, the transmitted signal is generated by superimposing the second chirp signals of the K types of SFs, but the duration of the second chirp signals of different SFs is different. The signal duration differs exponentially by powers of 2 between different SFs. For instance, the duration of a LoRa signal with SF=8 is twice that of a signal with SF=7, and the duration of a LoRa signal with SF=9 is twice that of a signal with SF=8, and so on.

Therefore, to facilitate normalizing signal energy, maximizing frequency spectrum efficiency and ensuring that the superimposed signals have the same duration, a LoRa signal with SF=8, for example, may be superimposed in a form equivalent to two concatenated LoRa signals with SF=7, that is, the LoRa signal with SF=7 can be divided into two sub-blocks, and the energy of the finally transmitted signal remains the same as that of a single LoRa signal with the same duration.

Then, the transmitted signal can be represented as a superposition composed of K parts $x_k$, specifically as:

$$x = \frac{1}{\sqrt{k}} \sum_{k=1}^{K} x_k \qquad (12)$$

Each part $x_k$ superimposed carries $$\left(\frac{N_1}{N_k}\right) s_k$$

modulated bits, and each part $x_k$ can be further subdivided into $$\frac{N_1}{N_k}$$

signal sub-blocks, with each signal sub-block carrying $s_k$ modulated bits. Consequently, each part $x_k$ can be expressed as $$x_k = \left[ x_k^T(1), x_k^T(2), \ldots x_k^T(a) \ldots , x_k^T\left(\frac{N_1}{N_k}\right) \right]^T,$$

where $$x_k^T(a)$$

represents the number of modulated bits carried by the $a_{th}$ signal sub-block corresponding to the $k_{th}$ type of SFs under the signal duration T.

Figure 5:
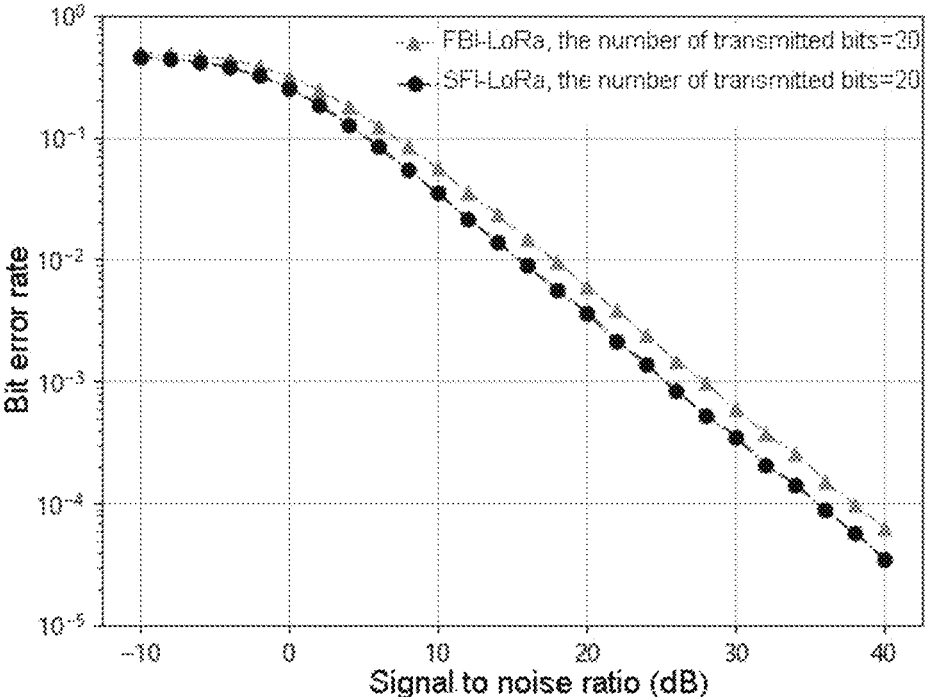
FIG. 5 shows the BER performance comparison among the LoRa system based on SFI, a conventional LoRa system, and a LoRa system based on a frequency bin index under a single-path Rayleigh fading channel.

Referring to FIG. 5, FIG. 5 shows the BER performance comparison among an SFI-LoRa system, a conventional LoRa system, and a LoRa system based on a frequency bin index under a single-path Rayleigh fading channel. It can be seen from FIG. 5 that, under a single-path Rayleigh fading channel, when carrying an equal number of bits per symbol, the BER performance of the SFI-LoRa system has an advantage of about 2 dB compared with the LoRa system based on a frequency bin index.

Figure 6:
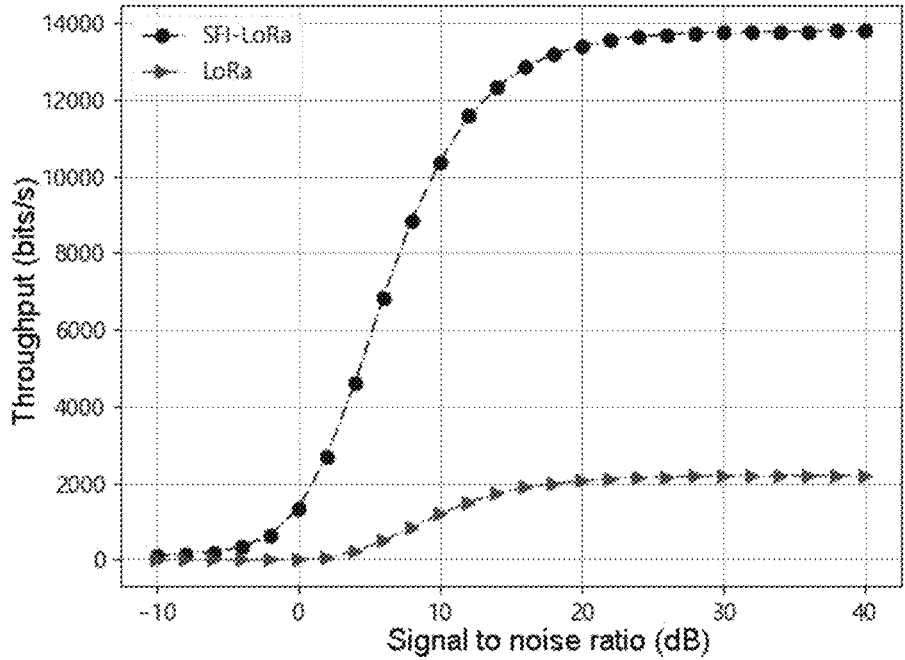
FIG. 6 shows the throughput performance comparison between the LoRa system based on SFI and the conventional LoRa system under the single-path Rayleigh fading channel.

Furthermore, referring to FIG. 6, which presents a throughput performance comparison between the SFI-LoRa system and the conventional LoRa system under the single-path Rayleigh fading channel. In the SFI-LoRa system, $$\lfloor \log_2 C_6^K \rfloor$$

index bits are carried via a carrier index, complemented by the $$\sum_{k=1}^{K} \left(\frac{N_1}{N_k}\right) s_k$$

carried modulated bits. Consequently, in one symbol period, the total number of the information bits is $$\sum_{k=1}^{K} \left(N_1/N_k\right) s_k + \lfloor \log_2 C_6^K \rfloor.$$

Assuming that the symbol duration is $T_{sym}$, the data rate of the present system can therefore be expressed as $$\frac{\left(\sum_{k=1}^{K} \left(N_1/N_k\right) s_k + \lfloor \log_2 C_6^K \rfloor\right)}{T_{sym}},$$

and the data rate of the LoRa system that can be realized in combination with the prior art can be expressed as $SF/T_{sym}$. Therefore, the disclosure has a significant improvement in the data rate compared to the LoRa system that can be realized in combination with the prior art, and at the same time, it can be seen from FIG. 6 that the solution designed by the disclosure also has a significant improvement in throughput performance.

In the disclosure, the conventional LoRa system is optimized and designed to greatly improve the data rate of the system, solving the technical problem that the lower data rate of the LoRa system in the prior art leads to the limitation of its application, and at the same time, it also has an advantage in terms of the BER performance and throughput performance, thus realizing an improvement in terms of the energy efficiency and the frequency spectrum efficiency, and improving the reliability of the communication. Therefore, the LoRa communication technology based on SFI provided in the disclosure can be a competitive low-power and high-speed radio communication technology.

Referring to FIG. 2, the following is a detailed description of an embodiment of a LoRa communication method based on SFI provided in a second aspect of the disclosure.

Step 201, a transmitted signal after passing through a time-invariant and frequency-flat channel is received to obtain a received signal; and the received signal is separately multiplied by conjugate signals of basic chirp signals of the various SFs to obtain a plurality of dechirp signals.

It is to be noted that the transmitted signal x is sent out by the transmitter, and after passing through a time-invariant and frequency-flat channel, the received signal received by the receiver can be expressed as:

$$\tilde{x} = hx + z(n) \qquad (13)$$

Then the received signal $\tilde{x}$ needs to be subjected to a dechirp operation to determine the index bits: using the approximate orthogonality between LoRa signals of different SFs, i.e. $x_k x_l \sim 0, 1 \leq k \neq l \leq 6$, using the conjugate signals $$w_{SF,0}^*(n)$$

of the basic chirp signals of different SFs separately multiplied by the received signal $$y = \tilde{x} w^*_{SF,0}(n)$$

to obtain a plurality of dechirp signals. In this step, the plurality of SFs refer to six SFs in particular, $SF \in \{7, 8, \ldots, 12\}$.

Step 202, a DFT is performed on all the dechirp signals to obtain DFT sequences.

In this step, the dechirp signal $y_{k,n}(i)$ is subjected to $2^{SF}$ point-DFT to obtain the DFT sequence, which is expressed as:

$$Y_{k,m}(i) = \sum_{n=0}^{N_k-1} y_{k,n}(i) \exp\left(\frac{-j2\pi mn}{N_k}\right), \forall i, k \tag{14}$$

Step 203, maximum values of all the DFT sequences are taken and sorted in descending order, top K maximum values are selected to form a target sequence, and the SF sequence is determined on the basis of the target sequence.

It is to be noted that the SF sequence S used by the transmitter can be obtained by selecting the first K larger values after the transform.

Step 204, the SF sequence is demapped to recover the corresponding index bits; and the received signal is demodulated on the basis of the SF sequence to obtain modulated bits.

For the index bits, the SF sequence is inputted into an index searcher, and the SF sequence is indexed in accordance with a combinatorial method to recover the corresponding decimal index bits.

For the modulated bits, the received transmitted signal (i.e., the received signal) is first divided into a plurality of signal sub-blocks on the basis of the SF sequence; dechirp, DFT, and peak detection are performed sequentially on the signal sub-blocks, to recover an index value for the peak of each signal sub-block. The index of the peak of each signal sub-block is the decimal modulated bits carried by the signal sub-block. Finally, the modulated bits are recovered on the basis of the index values associated with all the signal sub-blocks.

The modulated bits $\tilde{m}$ of various signal sub-blocks is specifically as:

$$\tilde{m} = \text{argmax}|Y_{k,m}(i)|, \forall i, k \tag{15}$$

Thus the detection of symbols transmitted in the SFI-LoRa system is realized.

Step 205, a serial-parallel conversion is separately performed on the index bits and the modulated bits to obtain an output bitstream.

It is understandable that after performing the serial-to-parallel conversion on the modulated bits and the index bits separately to recover them into the output bitstream $\hat{p}$, the demodulaon of the SFI-LoRa system is completed.

A detailed description of an embodiment of an SFI-LoRa system provided in a third aspect of the disclosure is as follows.

Figure 3:
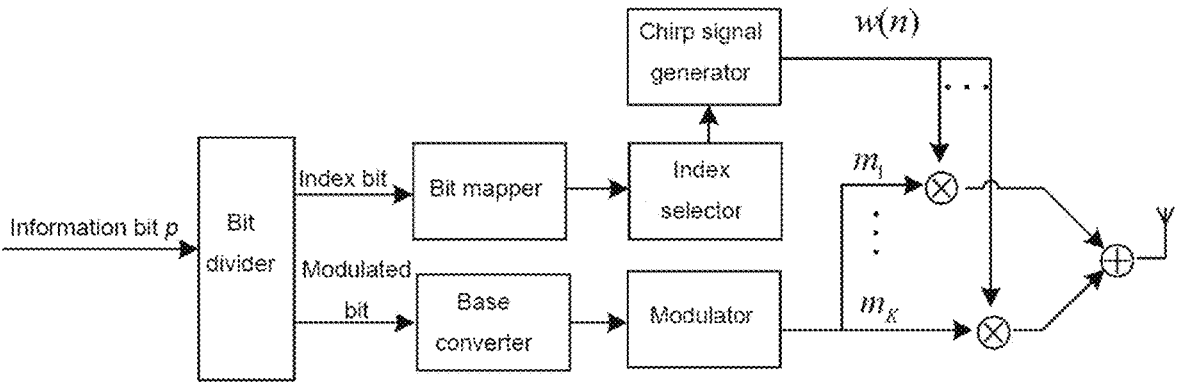
FIG. 3 is a structural diagram of a transmitter of a LoRa communication system based on SFI provided in an embodiment of the disclosure.

In the embodiment, an SFI-LoRa system is provided. Referring to FIG. 3, FIG. 3 is a first structural diagram of the SFI-LoRa system provided in an embodiment of the disclosure. The SFI-LoRa system includes a transmitter and a receiver.

The transmitter is configured to modulate information bits within one symbol period into a plurality of second chirp signals, and superimpose all the second chirp signals to obtain a transmitted signal and transmit the transmitted signal to the receiver.

The transmitter includes a bit divider, a bit mapper, an index selector, a chirp signal generator, a base converter and a modulator.

The bit divider is separately connected to the bit mapper and the base converter, and is configured to divide a plurality of information bits into a plurality of index bits and a plurality of modulated bits on the basis of the number of alternative SFs and an adjustable data rate parameter, transmit the index bits to the bit mapper, and transmit the modulated bits to the base converter.

The bit mapper is connected to the index selector, and is configured to map the index bits into an element serial number set according to a combinatorial method on the basis of the number of alternative SFs and the adjustable data rate parameter, and transmit the element serial number set to the index selector.

The index selector is connected to the chirp signal generator, and is configured to map the element serial number set into an SF sequence on the basis of a preset sequence mapping table; and generate first chirp signals corresponding to various SFs on the basis of a plurality of SFs of the SF sequence, where the SF sequence is S, $S=\{s_1, \ldots, s_K\}$, and K types of SFs are present in the SF sequence.

The base converter is connected to the modulator, and is configured to convert a plurality of modulated bits to decimal numbers associated with various SFs on the basis of the SF sequence; and modulate various decimal numbers into carrying signals, and multiply the carrying signals by the first chirp signals associated with the SFs to obtain second chirp signals associated with the various SFs.

The bit mapper is connected to the index selector, and is specifically configured to convert the index bits to decimal numbers; and map the decimal numbers into the element serial number set according to the combinatorial method on the basis of the number of alternative SFs and the adjustable data rate parameter, where the element serial number set is a monotonically decreasing sequence having a length identical to that of the adjustable data rate parameter.

Figure 4:
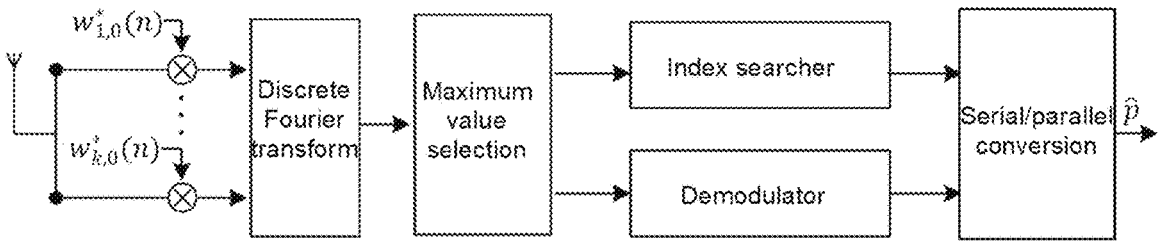
FIG. 4 is a structural diagram of a receiver of the LoRa communication system based on SFI provided in an embodiment of the disclosure.

Furthermore, referring to FIG. 4, FIG. 4 is a second structural diagram of the SFI-LoRa system provided in an embodiment of the disclosure.

The receiver includes an SF sequence generation unit, an index searcher, a demodulator and a conversion unit.

The SF sequence generation unit is separately connected to the index searcher and the demodulator, and is configured to receive a transmitted signal after passing through a time-invariant and frequency-flat channel to obtain a received signal; and separately multiply the received signal by conjugate signals of basic chirp signals of the various SFs to obtain a plurality of dechirp signals; perform a DFT on all the dechirp signals to obtain DFT sequences; take maximum values of all the DFT sequences and sort same in descending order, select top K maximum values to form a target sequence, and determine the SF sequence on the basis of the target sequence; and separately transmit the SF sequence to the index searcher and the demodulator.

The index searcher is connected to the conversion unit, and is configured to demap the SF sequence to recover index bits, and transmit the index bits to the conversion unit.

The demodulator is connected to the conversion unit, and is configured to demodulate the received signal on the basis of the SF sequence to obtain modulated bits.

The conversion unit is configured to perform a serial-parallel conversion separately on the index bits and the modulated bits to obtain an output bitstream.

In a fourth aspect of the disclosure, a LoRa communication apparatus based on SFI is further provided. The apparatus includes a processor and a memory.

The memory is configured to store a program code, and transmit the program code to the processor.

The processor is configured to execute the LoRa communication method mentioned above according to an instruction in the program code.

In a fifth aspect of the disclosure, a computer-readable storage medium is further provided. The computer-readable storage medium is configured to store a program code, and the program code is configured to execute the LoRa communication method mentioned above.

A person skilled in the art will readily appreciate that, for brevity and conciseness in description, the detailed operational procedures of the aforementioned system, device, and unit can be referred to the corresponding processes detailed in the preceding embodiments of the method, and are hereby omitted.

In the several embodiments provided in the present application, it is to be understood that the system, the device and the method disclosed can be realized in other ways. For example, the above-described embodiments of the device are merely schematic, the division of the unit is merely a logical functional division, and other division ways can be used when actually realized. For example, a plurality of units or components can be combined or can be integrated into another system, or some features can be ignored, or not implemented. At another point, the mutual coupling, direct coupling, or communication connection shown or discussed may be achieved via some interfaces, and an indirect coupling or communication connection between devices or units can be electrical, mechanical or in other forms.

The units described as separated components may or may not be physically separated, and the components shown as units may or may not be physical units, i.e., they may be located in a single place or may also be distributed to a plurality of network units. Some or all of these units may be selected to realize the objective of the solutions of the embodiments according to actual needs.

Furthermore, the various functional units in various embodiments of the disclosure can be integrated in a single processing unit, or the individual units may physically exist separately, or two or more units may be integrated in a single unit. The above integrated units may be realized either in the form of hardware or in the form of software functional units.

The integrated unit may be stored in a computer-readable storage medium if it is realized as a software functional unit and sold or used as a stand-alone product. On the basis of this understanding, the technical solution of the disclosure can be embodied essentially or in part as a contribution to the prior art, or all or part of the technical solution may be embodied in the form of a software product, which is a computer software product stored in a storage medium including a number of instructions for causing a computer apparatus (which may be a personal computer, a server, or a network apparatus, etc.) to carry out all or some of the steps of the method described in various embodiments of the disclosure. The aforementioned storage media include: a U flash disc, a mobile hard disk, a read-only memory (ROM), a random access memory (RAM), a magnetic disk or a compact disc and other media that can store program code.

The embodiment described above is merely used for illustrating the technical solutions of the disclosure, rather than limiting the disclosure. Although the disclosure is described in detail by reference to the foregoing embodiment, it is to be understood by those ordinary skilled in the art that the technical solutions set forth in each embodiment can still be modified or some technical features can be replaced equivalently, and those modifications or replacements cannot make the essence of the corresponding technical solutions out of the spirit and scope of the technical solutions in each embodiment of the disclosure.

The invention claimed is:

1. A long-range radio communication method based on a spreading factor index, comprising:

within one symbol period, dividing a plurality of information bits into a plurality of index bits and a plurality of modulated bits on the basis of the number of alternative spreading factors and an adjustable data rate parameter;

mapping the index bits into an element serial number set according to a combinatorial method on the basis of the number of alternative spreading factors and the adjustable data rate parameter;

mapping the element serial number set into a spreading factor sequence on the basis of a preset sequence mapping table; and generating first chirp signals corresponding to various spreading factors on the basis of a plurality of spreading factors of the spreading factor sequence, wherein the spreading factor sequence is S, $S=\{s_1, \ldots, s_K\}$, and K types of spreading factors are present in the spreading factor sequence;

converting the plurality of modulated bits to decimal numbers associated with various spreading factors on the basis of the spreading factor sequence, respectively; and modulating various decimal numbers into carrying signals, and multiplying the carrying signals by the first chirp signals associated with the spreading factors to obtain second chirp signals associated with the various spreading factors; and superimposing all the second chirp signals to obtain a transmitted signal, and transmitting the transmitted signal to a receiver.

2. The long-range radio communication method according to claim 1, wherein the number of the index bits is determined by the number of alternative spreading factors and the adjustable data rate parameter; and the number of the modulated bits is determined by the number of alternative spreading factors and the spreading factor sequence.

3. The long-range radio communication method according to claim 1, wherein the step of mapping the index bits into the element serial number set according to the combinatorial method on the basis of the number of alternative spreading factors and the adjustable data rate parameter comprises:

converting the index bits to decimal numbers; and mapping the decimal numbers into the element serial number set according to the combinatorial method on the basis of the number of alternative spreading factors and the adjustable data rate parameter, wherein the element serial number set is a monotonically decreasing sequence having a length identical to that of the adjustable data rate parameter.

4. The long-range radio communication method according to claim 1, further comprising:

receiving the transmitted signal after passing through a time-invariant and frequency-flat channel to obtain a received signal; and separately multiplying the received signal by conjugate signals of basic chirp signals of the various spreading factors to obtain a plurality of dechirp signals;

performing a discrete Fourier transform on all the dechirp signals to obtain discrete Fourier transform results;

sorting all the discrete Fourier transform results in descending order, and selecting top K discrete Fourier transform results to form a target sequence, and determining the spreading factor sequence on the basis of the target sequence;

demapping the spreading factor sequence to recover index bits; and demodulating the received signal on the basis of the spreading factor sequence to obtain modulated bits; and separately performing a serial-parallel conversion on the index bits and the modulated bits to obtain an output bitstream.

5. The long-range radio communication method according to claim 4, wherein the step of demodulating the received signal on the basis of the spreading factor sequence to obtain the modulated bits comprises:

dividing the received signal into a plurality of signal sub-blocks on the basis of the spreading factor sequence;

separately performing dechirp, the discrete Fourier transform and peak detection sequentially on the signal sub-blocks to recover index values of peaks of various sub-blocks; and recovering the modulated bits on the basis of all the index values associated with the signal sub-blocks.

6. A long-range radio communication system based on a spreading factor index, comprising: a transmitter and a receiver, wherein the transmitter is configured to modulate information bits within one symbol period into a plurality of second chirp signals, and superimpose all the second chirp signals to obtain a transmitted signal and transmit the transmitted signal to the receiver;

the transmitter comprises a bit divider, a bit mapper, an index selector, a chirp signal generator, a base converter and a modulator;

the bit divider is separately connected to the bit mapper and the base converter, and is configured to divide a plurality of information bits into a plurality of index bits and a plurality of modulated bits on the basis of the number of alternative spreading factors and an adjustable data rate parameter, transmit the index bits to the bit mapper, and transmit the modulated bits to the base converter;

the bit mapper is connected to the index selector, and is configured to map the index bits into an element serial number set according to a combinatorial method on the basis of the number of alternative spreading factors and the adjustable data rate parameter, and transmit the element serial number set to the index selector;

the index selector is connected to the chirp signal generator, and is configured to map the element serial number set into a spreading factor sequence on the basis of a preset sequence mapping table; and transmit the spreading factor sequence to the chirp signal generator;

the chirp signal generator is connected to the modulator, and is configured to generate first chirp signals corresponding to various spreading factors on the basis of a plurality of spreading factors of the spreading factor sequence, and transmit the first chirp signals to the modulator, wherein the spreading factor sequence is S, $S=\{s_1, \ldots, s_K\}$, and K types of spreading factors are present in the spreading factor sequence;

the base converter is connected to the modulator, and is configured to convert a plurality of modulated bits to decimal numbers associated with various spreading factors on the basis of the spreading factor sequence, and transmit the decimal numbers to the modulator; and the modulator is configured to modulate various decimal numbers into carrying signals, and multiply the carrying signals by the first chirp signals associated with the spreading factors to obtain second chirp signals associated with the various spreading factors.

7. The long-range radio communication system according to claim 6, wherein the bit mapper is connected to the index selector, and is specifically configured to convert the index bits to decimal numbers; and map the decimal numbers into the element serial number set according to the combinatorial method on the basis of the number of alternative spreading factors and the adjustable data rate parameter, wherein the element serial number set is a monotonically decreasing sequence having a length identical to that of the adjustable data rate parameter.

8. The long-range radio communication system according to claim 6, wherein the receiver comprises a spreading factor sequence generation unit, an index searcher, a demodulator and a conversion unit;

the spreading factor sequence generation unit is separately connected to the index searcher and the demodulator, and is configured to receive the transmitted signal after passing through a time-invariant and frequency-flat channel to obtain a received signal; and separately multiply the received signal by conjugate signals of basic chirp signals of the various spreading factors to obtain a plurality of dechirp signals; perform a discrete Fourier transform on all the dechirp signals to obtain discrete Fourier transform results; sort all the discrete Fourier transform results in descending order, and select top K discrete Fourier transform results to form a target sequence, and determine the spreading factor sequence on the basis of the target sequence; and separately transmit the spreading factor sequence to the index searcher and the demodulator;

the index searcher is connected to the conversion unit, and is configured to demap the spreading factor sequence to recover index bits, and transmit the index bits to the conversion unit;

the demodulator is connected to the conversion unit, and is configured to demodulate the received signal on the basis of the spreading factor sequence to obtain modulated bits, and transmit the modulated bits to the conversion unit; and the conversion unit is configured to separately perform a serial-parallel conversion on the index bits and the modulated bits to obtain an output bitstream.

9. A long-range radio communication apparatus based on a spreading factor index, the apparatus comprising a processor and a memory, wherein the memory is configured to store a program code, and transmit the program code to the processor; and the processor is configured to execute the long-range radio communication method according to claim 1 on the basis of an instruction in the program code.

10. A long-range radio communication apparatus based on a spreading factor index, the apparatus comprising a processor and a memory, wherein the memory is configured to store a program code, and transmit the program code to the processor; and the processor is configured to execute the long-range radio communication method according to claim 2 on the basis of an instruction in the program code.

11. A long-range radio communication apparatus based on a spreading factor index, the apparatus comprising a processor and a memory, wherein the memory is configured to store a program code, and transmit the program code to the processor; and the processor is configured to execute the long-range radio communication method according to claim 3 on the basis of an instruction in the program code.

12. A long-range radio communication apparatus based on a spreading factor index, the apparatus comprising a processor and a memory, wherein the memory is configured to store a program code, and transmit the program code to the processor; and the processor is configured to execute the long-range radio communication method according to claim 4 on the basis of an instruction in the program code.

13. A long-range radio communication apparatus based on a spreading factor index, the apparatus comprising a processor and a memory, wherein the memory is configured to store a program code, and transmit the program code to the processor; and the processor is configured to execute the long-range radio communication method according to claim 5 on the basis of an instruction in the program code.

14. A non-transitory computer-readable storage medium, the computer-readable storage medium being configured to store a program code, and the program code being configured to execute the long-range radio communication method according to claim 1.

15. A non-transitory computer-readable storage medium, the computer-readable storage medium being configured to store a program code, and the program code being configured to execute the long-range radio communication method according to claim 2.

16. A non-transitory computer-readable storage medium, the computer-readable storage medium being configured to store a program code, and the program code being configured to execute the long-range radio communication method according to claim 3.

17. A non-transitory computer-readable storage medium, the computer-readable storage medium being configured to store a program code, and the program code being configured to execute the long-range radio communication method according to claim 4.

18. A non-transitory computer-readable storage medium, the computer-readable storage medium being configured to store a program code, and the program code being configured to execute the long-range radio communication method according to claim 5.

*  *  *  *  *